E. H. MESSITER.
COMPENSATOR FOR AUTOMATIC WEIGHING MACHINES.
APPLICATION FILED AUG. 26, 1913.
1,251,680.
Patented Jan. 1, 1918.
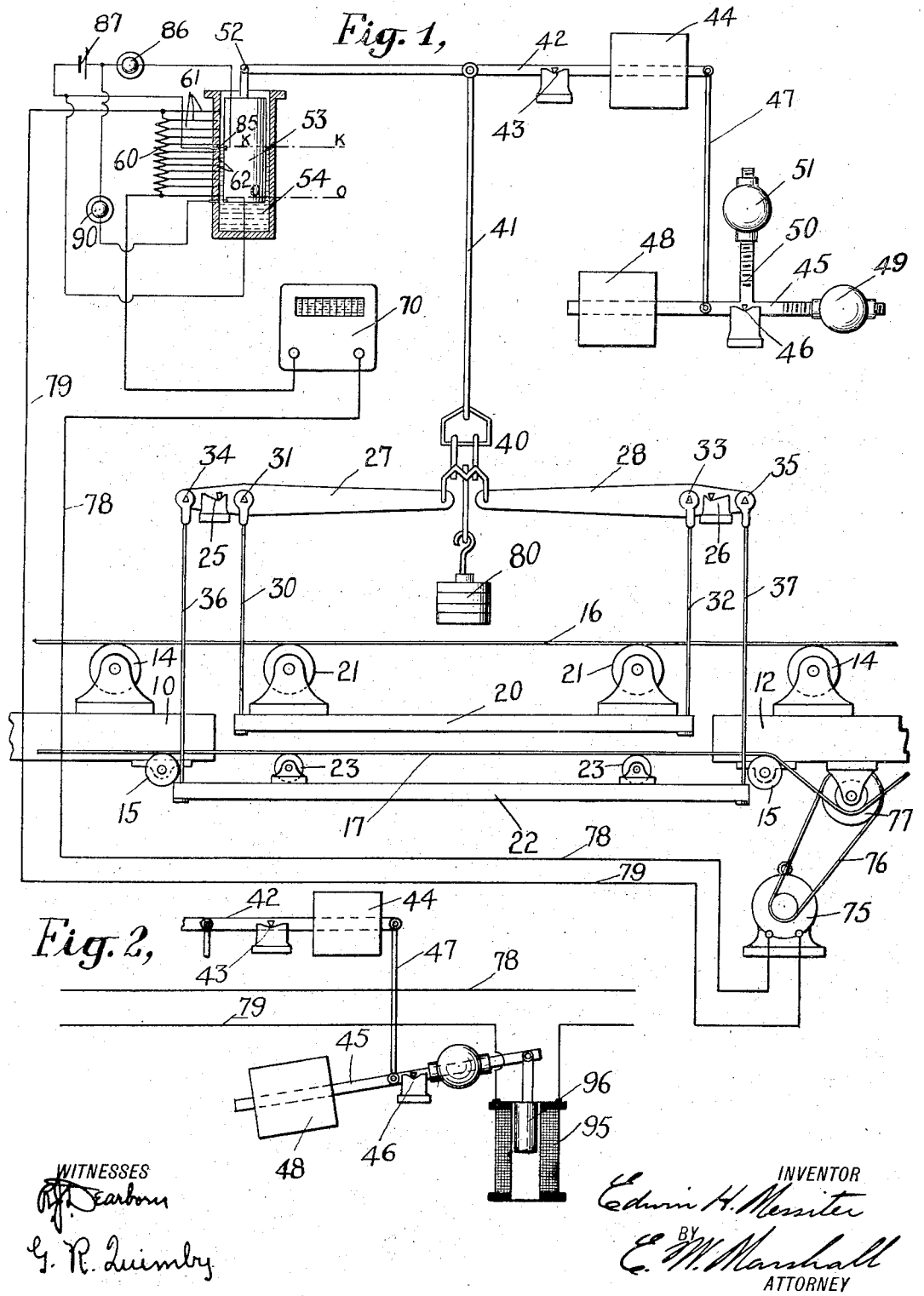

UNITED STATES PATENT OFFICE.

EDWIN H. MESSITER, OF BROOKLYN, NEW YORK, ASSIGNOR TO ELECTRIC WEIGHING COMPANY, OF NEW YORK, N. Y., A CORPORATION OF NEW YORK.

COMPENSATOR FOR AUTOMATIC WEIGHING-MACHINES.

1,251,680.   Specification of Letters Patent.   Patented Jan. 1, 1918.

Application filed August 26, 1913. Serial No. 786,673.

*To all whom it may concern:*

Be it known that I, EDWIN H. MESSITER, a citizen of the United States, and a resident of Brooklyn, county of Kings, and State of New York, have invented certain new and useful Improvements in Compensators for Automatic Weighing-Machines, of which the following is a specification, reference being had to the accompanying drawings, forming a part thereof.

My invention relates to automatic weighing machines and has special reference to such as are shown and described in my Patents Nos. 998,974 and 1,014,604 granted respectively on January 25th, 1911 and January 9th, 1912 and to my copending application Serial No. 544,782 filed February 19th, 1910.

One object of my present invention is to provide an improved apparatus of the character above indicated that shall embody simple and efficient means for automatically compensating for the effect of the belt tension in the device.

Other objects and advantages will be set forth hereinafter.

Referring to the drawings,—

Figure 1 is a diagrammatic view of a weighing machine embodying the automatic belt tension compensator of my invention.

A modification of my invention is shown in Fig. 2 in which an electromagnet is utilized in lieu of the compensating weight.

10 and 12 are stationary supports on which fixed pulleys 14 and 15 are mounted. A continuous conveyer belt is adapted to coöperate with these pulleys, an upper load carrying section being shown at 16 in engagement with the upper row of fixed pulleys 14, and an empty belt section being shown at 17 in engagement with the lower row of pulleys 15. Between the stationary supports are located a pair of floating platforms 20 and 22, which are suspended from scale beams 27 and 28 and are respectively provided with pulleys 21 and 23. The platform 20 is so placed that the pulleys 21 are in engagement with the belt section 16 while the pulleys 23 of the platform 22 engage the lower belt section 17.

The platform 20 is connected near one end by a link or chain 30 to the scale beam 27 at 31 and near its opposite end is similarly connected by a link 32 to the scale beam 28 at 33. The scale beam 27 is pivotally supported at 25 and is connected to the floating platform 22 by a link 36, the point of connection 34 between the beam and the link being located at the opposite side of the pivot 25 from the point 31.

The beam 28 is similarly pivoted at 26 and a link 37 connects a point 35, which corresponds to the point 34, with the floating platform 22.

The pivotal points 25 and 26 are so placed and the scale beams so proportioned that their adjacent ends are close together and are connected by means of an equalizer 40 and a single link 41 to a scale beam 42. Another scale beam 45 is pivoted at 46 and is connected by means of a link 47, with the beam 42 which is pivoted at 43. Weights 44 and 48 are mounted on the respective scale beams 42 and 45, the latter being also provided with an adjustable weight 49. The beam 45 is further provided with a substantially vertical arm 50, which is in alinement with the pivotal point 46 and has a weight 51 adjustably mounted on it.

One end of the scale beam 42 is connected at 52 with a plunger 53 which determines the level of mercury or other suitable conducting liquid in a column 54.

A resistance 60 is provided with a plurality of taps 61 which are connected to terminals 62 within the column 54, the arrangement of parts being such that as the liquid rises and falls in the column, a greater or less proportion of the resistance 60 is short circuited by the contact of the liquid with the terminals. This variable resistance is connected in circuit with a registering or recording ammeter 70 across the terminals of a generator 75. The electro-motive force of the generator is proportional to its speed and it is operatively connected by means of a belt 76 to a pulley 77. This pulley is connected to be operated by the belt section 17 so that the speed of the generator and the voltage of the circuit depend directly upon the speed of the conveyer belt.

As clearly set forth in my previous patents and application, to which reference has already been made, the position of the scale beam 42 and the adjustment of the resistance 60 depend upon the net weight of material transferred by the conveyer belt; therefore, by properly proportioning the parts and arranging the dials of the ammeter 70 to read in pounds or some other unit of weight, the total net weight of material delivered by the conveyer during a given period, may be accurately determined by reading the meter 70 at the beginning and at the end of the period.

The platform 20 is of course acted upon by the gross weight of the conveyer belt and the load which it carries, while the platform 22 is acted upon only by the tare which includes the belt itself and whatever part of the load may have stuck to it and have been undelivered.

Since the two platforms act oppositely upon the scale beams, the effect only of the net delivered load will be transferred through the equalizer 40 and the link 41 to the scale beam 42.

There is another factor which enters into the action however, and which may in some cases materially affect the result, namely, the action of the belt tension. When the load is light, the tension in the belt will affect the section 16 by dragging down on the pulleys 21 and so increasing the gross weight. On the other hand, the tension in the belt section 17 will under the same conditions tend to lift the belt from pulleys 23 and will consequently reduce the tare. It is therefore evident that these factors do not neutralize each other, but are added together.

If it is assumed that the weights 44, 48 and 49 are so adjusted that with a normal load on the conveyer the scale beams occupy substantially horizontal positions and the plunger 53 occupies such position that the level of the mercury is at an intermediate point K in the column 54; assuming further that under the same conditions the pulleys 14 and 21 are in alinement and the pulleys 15 and 23 in alinement, the effect of the belt tension will then be *nil*.

It will be observed that under the conditions assumed, the arm 50 of the scale beam 45 is vertical and the weight 51 has absolutely no effect since it is directly over the point of pivot 46.

A convenient method of adjusting the parts for normal load conditions is as follows: First raise the belt sections 16 and 17 out of engagement with the pulleys 21 and 23, hang a testing weight 80, which is designed to correspond to normal load, on the equalizer 40 as shown in the drawings, then adjust the weights 44 and 48 until a substantial balance is obtained. Finally adjust the weight 49 until the level of the mercury or other liquid in the column 54 comes exactly to the point K.

A pair of contact members 85 may conveniently be located in the column 54 at the level K and connected to a circuit including a signal lamp 86 and a battery or other source of energy 87. When the liquid then reaches the desired level, the lamp 86 is lighted and just as it falls below this level, the lamp goes out. Consequently the desired level may be determined by adjusting the weight 49 until the lamp flickers, indicating that the liquid is at the proper level.

When the load on the conveyer is below normal, the scale beams 27 and 28 are moved upwardly at their adjacent ends, the pulleys 21 are raised above the level of the pulleys 14 and the pulleys 23 lowered below the level of the pulleys 15; therefore the tension of the belt as already indicated, tends to increase the gross weight and decrease the tare. The actual movement of the pulleys and platforms is of course small and the belt sections are always in engagement with the pulleys. Nevertheless the belt tension exerts a downward pull on the pulleys 21 and reduces the weight on the pulleys 23.

As soon as the scale beam 45 is swung out of its balanced, horizontal position in response to the movement of the scale beams 27 and 28, the weight 51 becomes active to a greater or less degree, depending upon its position on the arm 50, and tends to correct the error introduced by the belt tension.

It is obviously swung in the opposite direction and has the opposite effect when the load on the conveyer belt is increased above normal. Under such conditions, the belt tension also acts oppositely since the pulleys 21 are then below the line of the pulleys 14 instead of above and the pulleys 23 are above instead of below the line of the pulleys 15.

In order to properly adjust the weight 51 on the arm 50, I prefer to utilize the following method. The conveyer belt is first empty, the test weight 80 is hung on the equalizer, a certain amount of material such as scraps of metal, are thrown onto one belt section or the other until the scale beams balance as before, the same adjustment of the weights 44, 48 and 49 being maintained. This balance is determined as before by maintaining the level of the liquid at the position K. The test weight 80 is next unhooked from the equalizer and since there is no load on the conveyer, the scale beams are swung so that the link 41 moves upwardly and the arm 50 of the beam 45 swings to the right. The mercury in the column falls and the weight 51 is adjusted until the mercury level corresponds to a no load point 0 which is indicated by a lamp 90 and may be previously determined with the belts lifted off of the pulleys.

As an example of other means for compensating for the belt tension in the device, reference may be had to Fig. 2 in which like parts are designated by the same reference characters. An electromagnet winding 95 is connected in series relation with the resistance 60 and the ammeter 70 and is arranged to influence a core 96 which is suspended from the scale beam 45 near one end.

The parts are so arranged that the pulleys 14 and 21, and 15 and 23 are in alinement at zero load instead of at normal load as in the structure of Fig. 1 and the belt tension therefore increases with the load. The action of the magnet also varies with the load and consequently by properly proportioning the parts and designing the magnet, its pull is just equal and opposite to the belt tension in its effect upon the scale beam 42.

Other variations may be effected within the spirit and scope of my invention and I intend to be limited only by the appended claims.

What I claim is:

1. In apparatus of the character described, the combination with a conveyer belt, a scale beam and interposed means for affecting the scale beam in proportion to the load carried by the belt, of means including a member pivoted to exert a variable force for so acting upon the scale beam as to automatically compensate for the effect of the tension in the belt.

2. In apparatus of the character described, the combination with a conveyer belt, a scale beam, floating pulleys in respective engagement with a load bearing section and an empty section of the belt and interposed means so arranged that the belt sections act oppositely upon the scale beam, of automatic means dependent upon variations of the load on said load-bearing section acting on the scale beam in opposition to the belt tension.

3. In apparatus of the character described, the combination with a conveyer belt, a pivoted scale beam and means connecting a load bearing section and an unloaded section of the belt with said beam at points respectively on opposite sides of its pivot, of means associated with the scale beam and acting in opposite directions thereon in opposition to the belt tension for automatically compensating for the effect of the belt tension on the scale beam.

4. In apparatus of the character described, the combination with a conveyer belt, a pivoted scale beam and interposed means for affecting the scale beam in proportion to the load carried by the belt, of a weighted arm extending upwardly from the scale beam pivot and adapted to counteract the effect of the belt tension on the scale beam.

5. In apparatus of the character described, the combination with a conveyer belt, a scale beam and interposed means for affecting the scale beam in proportion to the load carried by the belt, of an auxiliary weight operatively connected to the scale beam and arranged to be actuated by the changes in the position of the scale beam to offset the effect of belt-tension variations thereon.

6. In apparatus of the character described, the combination with a conveyer belt, a pivoted scale beam, and means connecting a load bearing section and an unloaded section of the belt with said beam at points respectively on opposite sides of its pivot, of means acting in opposite directions upon the scale beam in proportion to the load variations of the conveyer belt above and below a predetermined amount for automatically compensating for the tension of the belt in its effect upon the scale beam.

7. In apparatus of the character described, the combination with a conveyer belt, and a scale beam, connected to be oppositely influenced by a load bearing and an unloaded section of the belt, of a weighted arm extending vertically from the scale beam pivot when the beam is balanced and adapted to swing to one side or the other from the vertical and to exert an influence on the beam in opposition to the belt tension when the load on the belt is varied to unbalance the beam in one direction or the other.

8. In apparatus of the character described, the combination with a belt conveyer, main scale beams, a load bearing section and an unloaded section of said belt conveyer means for suspending both of said belt sections from said beams and arranged to act thereon in opposition to each other and an auxiliary scale beam, of a recording or registering instrument, means dependent upon the auxiliary beam for automatically regulating the instrument and automatic means dependent upon the position of the auxiliary beam for acting thereon in opposition to the effect of the belt tension thereon.

9. In apparatus of the character described, the combination with a conveyer belt, and a scale beam and a floating member connected to the scale beam and bearing a section of the belt, of a weight associated with the scale beam and acting in opposite directions thereon dependent upon the load on the belt and adapted to automatically offset the effect of the belt tension as the floating member rises above and falls below, a predetermined position, in which the aforesaid belt section is in alinement with the adjacent belt sections.

10. In apparatus of the character described, the combination with a conveyer belt, and a scale beam connected to be influenced by a section of the belt, of a weight associated with the scale beam and adapted to be automatically shifted to offset the effect of the belt tension, as the position of the aforesaid belt section varies under varying load conditions.

11. In apparatus of the character described, the combination with a conveyer belt and a scale beam connected to be influenced by a section of the belt, of a recording or registering instrument, means dependent upon the position of the scale beam for automatically regulating the instrument, and automatic means connected to be moved by the varying position of the aforesaid belt section, under varying load conditions to one side or the other of a neutral position and to act in one direction on the scale beam when on one side of said neutral position and in the opposite direction when on the other side of its neutral position.

12. In apparatus of the character described the combination with a conveyer belt, and a scale beam having a weight thereon and connected to be influenced by a load bearing section of the belt, of means arranged to be actuated by changes in the plane of the belt to coöperate with the scale beam weight to offset the effect of variations of belt tension due to such changes in the plane of the belt.

13. In apparatus of the character described the combination with a conveyer belt, and a scale beam having a weight thereon and connected to be influenced by a load bearing section of the belt, of an auxiliary weight arranged to be shifted by changes in the plane of the belt to coöperate with the scale beam weight to offset the effect of variations of belt tension due to such changes in the plane of the belt.

14. In apparatus of the character described, the combination with a conveyer belt and a scale beam connected to be oppositely influenced by a load bearing and an unloaded section of the belt, of a recording or registering instrument, means dependent upon the position of the scale beam for automatically regulating the instrument, and automatic means dependent upon the positions of said belt sections relative to the adjacent belt sections for compensating for the belt tension in the device under varying load conditions.

In witness whereof I have hereunto set my hand this 25 day of August, in the year 1913.

EDWIN H. MESSITER.

Witnesses:
G. R. QUIMBY,
ERNEST W. MARSHALL.